United States Patent [19]

Kordomenos et al.

[11] Patent Number: 4,480,084

[45] Date of Patent: Oct. 30, 1984

[54] POLYMERIC LIGHT STABILIZERS

[75] Inventors: Panagiotis I. Kordomenos, Mt. Clemens; Delores J. Alexander, Southfield; David M. Thomson, Mt. Clemens, all of Mich.

[73] Assignee: Ford Motor Company, Dearborn, Mich.

[21] Appl. No.: 553,321

[22] Filed: Oct. 13, 1983

[51] Int. Cl.$^3$ .................... C08G 59/50; C08G 65/26; C08K 5/34

[52] U.S. Cl. ................................... 528/118; 528/111; 528/113; 528/310; 528/341; 528/361; 528/407; 546/188; 525/113; 525/438; 525/452

[58] Field of Search ............... 528/111, 113, 118, 310, 528/341, 407, 361; 546/188

[56] References Cited

U.S. PATENT DOCUMENTS

| | | |
|---|---|---|
| 3,684,765 | 8/1972 | Matsui et al. . |
| 4,056,507 | 11/1977 | Ramey et al. . |
| 4,086,207 | 4/1978 | Cassandrini et al. . |
| 4,089,842 | 5/1978 | Ramey et al. . |
| 4,166,813 | 9/1979 | Soma et al. . |
| 4,219,464 | 8/1980 | Ramey et al. . |
| 4,226,999 | 9/1980 | Malherbe et al. . |
| 4,234,734 | 11/1980 | Karrer . |
| 4,265,803 | 5/1981 | Soma et al. . |
| 4,299,926 | 11/1981 | Rody et al. . |
| 4,311,820 | 1/1982 | Nikles . |
| 4,312,804 | 1/1982 | Minagawa et al. . |
| 4,316,387 | 2/1982 | Molt et al. . |
| 4,319,030 | 3/1982 | Wiezer et al. . |
| 4,340,533 | 7/1982 | Rody . |
| 4,344,877 | 8/1982 | Nikles et al. . |
| 4,371,644 | 2/1983 | Soma et al. . |
| 4,377,651 | 3/1983 | Leininger . |

*Primary Examiner*—Earl A. Nielsen
*Attorney, Agent, or Firm*—Lorraine S. Melotik; Roger L. May

[57] ABSTRACT

This invention is directed to polymeric compounds which contain the polyalkylpiperidine radical and at least two primary hydroxyl groups. These compounds are useful as light stabilizers for plastics and coatings. More particularly, the polymeric stabilizers is formed by chain extending polyalkylpiperidine with an excess of epoxy resin to form a diepoxide functional polymer which is then capped with hydroxy functional monomer.

8 Claims, No Drawings

POLYMERIC LIGHT STABILIZERS

TECHNICAL FIELD

This invention relates to polymeric compounds which can be used as light stabilizers for various polymeric substrates, particularly for coating compositions. These compounds contain the sterically hindered polyalkylpiperidine radical and at least two primary hydroxyl groups which are available for crosslinking with, e.g., the coating materials.

BACKGROUND ART

It is known that derivatives of polyalkylpiperidines, and specifically those that are substituted in the 4-position, are very effective light stabilizers for coatings and plastics. Examples of such compounds are the ethers, esters and carbamates of 2,2,6,6-tetraalkylpiperidine-4ols, such as described in U.S. Pat. Nos. 4,056,507; 4,089,842; 4,219,464; 4,226,999; 4,234,734 and 4,311,820. Some types of polyalkylated 4-amino piperidine derivatives are disclosed in U.S. Pat. Nos. 3,684,765; 4,166,813 and 4,316,837. Still other types of light stabilizers containing the polyalkylpiperidine radical have a variety of 4-substituents as disclosed in U.S. Pat. Nos. 4,265,803; 4,299,926; 4,312,804 and 4,319,030.

It is well known in the art that while the polyalkylpiperidine radical is effective as a light stabilizer for synthetic polymers, low molecular weight piperidine derivatives are relatively volatile and are thus subject to migration out of the coating or plastic, particularly during processing. In some instances these stabilizers can be easily extracted from the synthetic polymers with water or with organic solvents making them of little practical use for the stabilization of synthetic polymers. Most of the patents cited above represent attempts to overcome these problems by making higher molecular weight and especially polymeric derivatives of polyalkylpiperidines. In general, the capacity for migration and the extractability of the stabilizer do indeed fall as molecular weight increases but, on the other hand, the compatibility of the stabilizer, particularly polymeric stabilizers, with the synthetic polymer to be protected also decreases. This compatibility is, however, dependent not only on the molecular weight of the stabilizer but also on its chemical structure and the nature of the synthetic polymeric substrate to be protected.

DISCLOSURE OF THE INVENTION

This invention provides a crosslinkable polymeric hindered amine light stabilizer particularly suitable for use in coating compositions. This stabilizer is characterized in that it has a number average molecular weight ($\overline{M}_n$) of between of about 500 and about 2000 and contains at least two, on average, primary hydroxyl groups. The stabilizer is the reaction product of:

(A) epoxy resin containing, on average, two epoxide groups per molecule; and (B) polyalkylpiperidine being selected from compounds represented by the chemical formula:

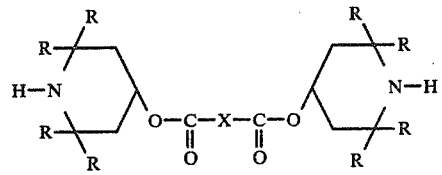

wherein R is selected from any $C_1$-$C_6$ alkyl group and X is a group containing between about 2 and about 36 carbon atoms, and wherein the epoxy resin and the polyalkylpiperidine are reacted in a molar ratio of between about 6:5 and about 2:1 so as to form an epoxide functional polymer containing, on average, about 2 epoxide groups per molecule; and (C) monomer containing at least one primary hydroxyl group and a reactive functionality capable of reacting with the epoxide groups of the epoxide functional polymer, wherein the monomer is employed in amounts which are sufficient to react essentially all of the epoxide groups present on the epoxide functional polymer.

Advantageously, the polymeric light stabilizers of this invention contain the polyalkylpiperidine radical and overcome the deficiencies of prior art stabilizers in that they have increased solubility in coating systems.

Another advantage of these polymeric light stabilizers, as compared with monomeric light stabilizers of comparable structure, is that they exhibit increased resistance to migration and volatilization out of the coating composition.

Still another advantage of these polymeric light stabilizers is their ability to react with conventional crosslinkers in the coatings, such as amino resins and isocyanates, whereby the stabilizers are chemically incorporated into the coating.

BEST MODE FOR CARRYING OUT THE INVENTION

The present invention is directed to a new class of polymeric ultraviolet light stabilizers having a number average molecular weight ($\overline{M}_n$) of between about 500 and about 2000, preferably between about 700 and about 1500, and which contain the polyalkylpiperidine radical and at least two, on the average, primary hydroxyl groups.

As has been disclosed in the brief description of the invention above, the stabilizer is the reaction product of materials which include an epoxy resin (A), which contains, on average, two epoxide groups per molecule. Preferably this epoxy resin has a molecular weight of between about 150 and about 600. Epoxy resins suitable for use in this invention include low molecular weight diepoxide resins which can be liquid or solid and either a single epoxy resin or a mixture of suitable epoxies. Suitable epoxy resins which may be used in this invention include those which are the condensation products of bisphenol-A with epicholorohydrin, example of which are commercially available of Epon 828, 829, 1001, 1004, 1007 and 1009 (Marketed by and a trademark of Shell Chemical Company, Houston, Tex.), Araldite 6001, 8001, RD-4, CY-178 and CY-179, (Marketed by and a trademark of Ciba-Geigy Corp., Ardley, N.Y.); ester type diepoxides such as diglycidyl methacrylate, diglcidyl adipate, and diglycidyl glutarate; cycloaliphatic diepoxides such as dicyclopentenediene and vinyl cyclohexane dioxide; and aliphatic ether type diepoxides such as ethylene glycol, diglycidyl ether, 1,2-propylene glycol diglycidyl ether and 1,4-butanediol diglycidyl ether (Araldite RD-2, available from and a trademark of Ciba-Geigy). Thus these epoxy resins may be any of the wide variety of diepoxide resins which are aliphatic, cycloaliphatic, or may contain aromatic or ethylenic unsaturation. Epoxies may also may be substituted by non-interfering functionality such as hydroxyl or the carbon chain may be interrupted, for example, by oxygen. In forming the stabilizer of this invention, it is preferred that the epoxy resin be a saturated epoxy resin and also that the epoxy resin contain terminal epoxide groups. Selection of other suitable epoxy resins useful in this invention will be apparent to one skilled in the art in view of the present disclosure.

Polyalkylpiperidines (B) useful in forming the stabilizer of this invention are selected from compounds represented by the chemical formula:

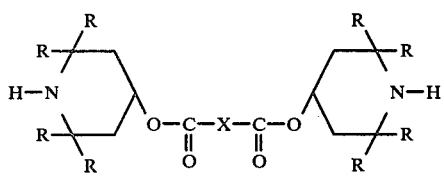

wherein each R is selected from any $C_1$–$C_6$ alkyl group, preferably each R is a methyl group. In this formula, X is a group containing between about 2 and about 36 carbon atoms and may be, for example, selected from aliphatic, aromatic, etc., groups which may be interrupted, for example, by sulfur, or oxygen. Preferably, however, X represents an alkylene group having from about 2 to about 10, preferably about 2 to 8 carbon atoms. Commercially available polyalkylpiperidines of this type include Tinuvin-770 (available and a trademark of Ciba-Geigy, Corp., Ardsley, N.Y.). wherein each R is a methyl group and X is $(CH_2)_8$.

The epoxy resin and the polyalkylpiperidine are reacted in a molar ratio of between about 6:5 and about 2:1 so as to form an epoxide functional polymer. As can be seen from the ratio of these reactants, excess epoxide equivalents (relative the polyalkyl piperidine equivalents) are always employed so as to generate an epoxy resin-polyalkylpiperidine addition polymer which contains on average, two epoxide groups per molecule. The particular preferred ratios to be employed would be dependent on the molecular weights of the epoxy resin and the polyalkylpiperidine reactants employed, keeping in mind the particular embodiment and molecular weight of stabilizer desired. The reaction of the epoxy resin and polyalkylpiperidine comprises reaction of the active hydrogen of the sterically hindered amine of the piperidine radical with the epoxy group of the epoxy resin, wherein an addition polymer is generally formed which comprises alternating epoxy resin and polyalkylpiperidine moieties of the type A—B$+$A—B$+_n$A wherein n=0–4. Thus, it can be seen that this epoxide functional polymer will generally contain, on average, about two epoxide groups per molecule, that is, one located in proximity to each end of the polymer molecule. It is these unreacted epoxide groups on this polymer which are then available for reaction with monomer (C).

The monomer (C) employed in this invention contains at least one primary hydroxyl group and a reactive functionality capable of reacting with the epoxide groups of the epoxide functional polymer. This monomer caps the epoxide functional polymer while adding at least one primary hydroxyl group near each end of the stabilizer polymer. In forming the stabilizer, the monomer is employed in amounts sufficient to react essentially all of the epoxide groups present on the epoxide functional polymer, that is, in amounts sufficient to allow the reaction of about one equivalent of epoxide reactive functionality (of monomer (C)) per each equivalent of epoxide groups of the epoxide functional polymer. While this monomer contains at least one primary hydroxyl group, it may contain more than one primary hydroxyl group, or a mixture of at least one primary hydroxyl group and other hydroxyl groups such as secondary hydroxyl groups. These hydroxyl groups, as well as the hydroxyl groups generated on the light stabilizer as a result of e.g., the epoxy resin and polyalkylpiperidine reaction, are available for reaction with the crosslinkers of the substrate composition being stabilized. It is believed, that the primary hydroxyl groups, which are a necessary part of the stabilizer, will be most readily reacted into the substrate composition with the crosslinking material.

The monomers which are reacted in chain terminating reaction with the epoxide functional polymer may be selected from a broad class of aliphatic, cycloaliphatic and aromatic (primary) hydroxy functional monomers which contain an epoxide reactive functionality. Exemplary of monomer which may be so employed in this invention include hydroxy functional carboxylic acids and hydroxy functional secondary amines.

Suitable hydroxy functional acids which may be employed as the monomer (C) in this invention include $C_3$–$C_{26}$ hydroxy acids, wherein the acid contains one carboxyl group and one or more hydroxyl groups and no other functional groups that would interfere with the chain termination reaction between the epoxide functional and the hydroxy acid monomer. The hydroxy functional acids which are preferably employed correspond to the general chemical formula:

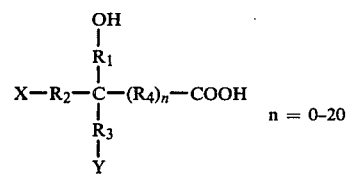

$n = 0\text{--}20$ wherein $R_1$, $R_2$, $R_3$ and $R_4$ are preferably lower alkylene groups such as methylene and ethylene and X, Y correspond to hydrogen or hydroxyl or any other non-interfering functionality as nitrile ester group, halogens, amides, etc. Suitable hydroxy acids which may be employed in the chain terminating reaction with the epoxide functional polymer include, but are not limited to, dimethylol propionic acid, bis(hydroxy ethyl) propionic acid, bis(hydroxy propyl) propionic acid, and the like. Preferably, the hydroxy acid contains two or more hydroxyl groups, i.e., at least one of X and Y contains a hydroxyl group. The preferred acid for capping the epoxide functional polymer is dimethylol propionic acid.

Exemplary of such hydroxy functional secondary amines which may be employed as the monomer (C) in this invention are those which bear mono or dihydroxy functionality, such as those having the chemical formula:

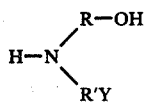

wherein R and R' are selected from the group consisting of aliphatic, cycloaliphatic and aromatic radicals which will not interfere with the chain termination reaction between the epoxide functional polymer and the hydroxy functional secondary amine. R and R' of the above formula for the secondary amine may be the same or different, but preferably they should be of the same nature. Most preferably, R and R' are methylene, ethylene, or lower alkylene groups but they may be any other non-interfering radical including those, for example, such as benzoyl, alkaline or oxyakylene, etc. Y may be selected from the hydrogen and the hydroxy radical. At least one of the hydroxyl groups or R and/or R' must be a primary hydroxyl. However, while other hydroxy group, if present, may be secondary or tertiary hydroxyls, it is preferred that all such hydroxyl groups be primary hydroxyl groups.

Particular preferred primary hydroxyl bearing amines for use in preparing the hydroxy functional polymeric high stabilizer are diethanol amine, methyl ethanol amine, dipropanol amine and methylpropanol amine.

In one embodiment of the polymeric stabilizer of this invention, the epoxy resin (A) and polyalkylpiperidine (B) are combined and reacted under conditions and for a time necessary to form the epoxide functional polymer. These conditions may include the presence of a catalyst and/or elevated temperatures. This epoxide functional polymer is subsequently reacted with the chain terminating monomer (C) under suitable conditions so as to form the polymeric light stabilizer. In another embodiment of the stabilizer, all three of the materials necessary for the formation of the polymeric light stabilizer, that is the epoxy resin (A), the polyalkylpiperidine (B) and reactive monomer (C) are combined and reacted together, i.e., insitu, to form the stabilizer. Selection of the process for stabilizer formation would be dependent on the chemical reactivity of the particular monomer (C) employed to terminate the chain, as is apparent to one skilled in the art. For example, if the hydroxy functional monomer (C) employed in making the stabilizer is a hydroxy acid, all three of the reactants could be combined and reacted insitu as described in the second reaction sequence. However, the first reaction sequence (two step) could also be followed if desired. On the other hand, if a hydroxy functional secondary amine is employed as the hydroxy functional monomer (C) it would be appropriate to follow the first reaction sequence described, i.e., wherein the polyalkylpiperidine and epoxy resin are first combined and reacted (to form the epoxide functional polymer) after which the amine monomer is added to terminate the reaction product chain.

Catalysts may be employed in this invention as may be necessary in the formation of the stabilizer. For example, catalysts commonly used to catalyze the epoxide/carboxyl reaction include tetraalkylammonium salts such as tetramethyl ammonium chloride, tetraethyl ammonium bromide and tetramethyl benzyl ammonium chloride as well as metal salts of a carboxylic acid, such as potassium octoate, chromium (III) octoate, other useful catalysts include metal halide such as chromium trichloride, ferric trichloride and aluminum trichloride; mercaptans and thioethers such as dimercapto propynol and dimercapto diethyl ethers, tertiary amines such as triethyl amine, pyridine, dimethyl aniline, quinoline, Beta-picoline, methyl pyridine; and the like. Generally the above reactions would be carried out in the presence of a suitable solvent such as toluene, xylene, methyl amyl ketone, etc. Selection of suitable reaction conditions for carrying out the formation of this polymeric stabilizer would be within the skill of one in the art in view of the disclosure of this application.

Polymeric substrates that can be stabilized with these polymeric hindered amines include, but are not limited to, acrylics, polyesters, and polyurethanes. The amount of the polymeric hindered amines needed to stabilize these synthetic polymers will depend upon various factors, including the type of synthetic polymer, its intended use, and the presence of other additives or stabilizers, if any. Generally however, effective stabilization of this substrate is achieved by employing the polymeric hindered amine in the substrate composition in an amount of between about 0.5 percent to about 5 percent by weight based on the weight of the polymeric substrate, e.g., based on the weight of the coating system.

The stabilizer of this invention can be employed as a sole stabilizer or, preferably in combination with other conventional heat and light stabilizers for the particular polymer. Preferred co-stabilizers are several substituted benzotriazoles such as, for example, hydroxy-phenyltriazoles such as 2-(2'hydroxy-5'-methylphenyl) benzotriazole, 2-(2'-hydroxy-phenyl) benzotriazole, 2-(2'hydroxy-5'-octylphenyl) naphthiotriazole.

The composition may contain other additives useful in such compositions such as antioxidants, plasticizers, filler dyes, etc. Such materials are well known in the art.

The polymeric stabilizer may be incorporated into the polymeric substrate by any of the known techniques for compounding additives with a polymer. For example, the polymer and the additive may be compounded by dry blending with the substrate in powder or grandular form, followed by milling, Banbury mixing, molding, casting, extruding, swelling, and the like. Alternatively, the polymer may be added, as a solution or slurry in a suitable inert solvent, or dispersant, to the polymeric substrate in powder or granular form, the whole mixed intimately in a mixer, and the solvent subsequently removed. As a further possibility, the polymer may be added to the polymeric substrate during the preparation of the latter, for instance at the latex stage of polymer production, to provide prestabilized polymer material.

INDUSTRIAL APPLICABILITY

It will be apparent from the foregoing that this invention has industrial applicability to plastics and coating compositions and provides polymeric compounds useful as light stabilizers for these substrates.

The invention will be further understood by referring to the following detailed examples. It should be understood that the specific examples are presented by way of illustration and not by way of limitation. Unless otherwise specified, all references to "part" is intended to means parts by weight.

EXAMPLE I

In a suitable reactor 282 gms of Eponex 151 (trademark of Shell Chemical Co.), 192 gms of Tinuvin-770, (trademark of Ciba-Geigy), 57 gms of DMPA (dimethylol propionic acid), 2 gms of lithium neodecanoate, 114 gms of methyl amyl ketone, and 114 gms of xylene were charged. The mixture was heated up to 149° C. in a period of 30 minutes. The temperature was raised to 177° C. by distilling solvent and was kept at this temperature for 1 hour. At this point the acid number was measured to be 1.8. The mixture was thinned to 70% NV with methyl amyl ketone and had a viscosity of $Z_3$.

EXAMPLE II

In a suitable reactor 222 gms of Tinuvin-770 (trademark of Ciba-Geigy), 186 gms of Araldite RD-2 (available from and trademark of Ciba-Geigy), 66 gms of DMPA (dimethylol propionic acid), 101.5 gms of methyl amyl ketone, and 101.5 parts of xylene were added. The mixture was heated up to 149° C. and kept at this temperature for 2½ hours. The final product had an $S\frac{1}{2}$ viscosity, 72% NV and O acid number.

EXAMPLE III

In a suitable reactor 282 gms of Eponex 151, 192 gms of Tinuvin-770 (trademark of Ciba-Geigy) and 30 gms of xylene were charged. The mixture was heated up to 182° C. and stirred at this temperature under nitrogen for 2 hours. Then it was cooled at 93° C. and 420 gms of diethanolamine and 30 gms of methyl amyl ketone were added. The temperature was raised to 160° C. and kept there for 1 hour. The final product had a viscosity of U at 71.9% NV.

EXAMPLE IV

In a suitable reactor 562 gms of Esterdiol-204 (trademark of Union Carbide) and 360 gms of xylene were charged. The mixture was brought to reflux (149° C.) and any water present was stripped out. The temperature was lowered to 93° C. and 360 gms of Desmondur W (trademark of Mobay Chemical Co.) was added dropwise in a period of 1 hour. After the end of the addition, the mixture was postreacted at 93° C. until no NCO group was observed in an IR spectrum. At this point, 240 gms of PCP-0301 (polycaprolactone triol, trademark of Union Carbide) 263 gms of adipic acid, 3 gms of dibutyl tin oxide, and 215 gms of xylene were added. The mixture was heated up to 204° C. and water was distilled off until the acid number dropped below 10. The batch was then thinned with 480 parts of methyl amyl ketone. The final product had $Z_3$ viscosity at 70.8% NV and acid number 1.2.

EXAMPLE V

Flexible basecoat composition was formulated with the following components:

| Components | Parts |
| --- | --- |
| Resin of Example IV | 50 |
| Stabilizer of Example I | 2.4 |
| Spenlite 206-30S[1] | 100 |
| Cymel 1130[2] | 46 |
| Tinuvin 328[3] | 3.6 |
| PTSA (40%) | 1.5 |
| 5000-AR[4] | 50 |
| Xylene | 75 |
| Isopropyl alcohol | 75 |

| Components | Parts |
| --- | --- |
| Syrfynol-104[5] | 6 |

[1]Trademark, Spencer-Kellogg, Buffalo, N.Y.
[2]Trademark, American Cyanamid Company, Wayne, New Jersey
[3]Trademark, Ciba-Geigy Corp.
[4]Aluminum paste, supplier Silberline, Lansford, PA.
[5]Trademark, Air Products and Chemicals, Inc. Allentown, PA. (Surfactant, 2, 4, 7, 9-tetramethyl-5-decyn-4,7-diol)

The above composition was reduced to 20 sec. at #4 Ford Cup with methyl amyl ketone before spraying. A control composition (without the stabilizer of Example I) was also prepared in a similar manner.

EXAMPLE VI-VIII

Flexible clearcoat compositions were formulated with the following components:

| Composition | Example VI | Example VII | Example VIII |
| --- | --- | --- | --- |
| Resin of Example IV | 414 | 414 | 414 |
| Stabilizer of Example I | 8.2 | | |
| Stabilizer of Example II | | 8.2 | |
| Stabilizer of Example III | | | 8.2 |
| Cymel 1130[1] | 95 | 95 | 95 |
| Tinuvin-328[2] | 5.8 | 5.8 | 5.8 |
| 2-ethyl hexanol | 12.5 | 12.5 | 12.5 |
| methanol | 43 | 43 | 43 |
| methyl amyl ketone | 131 | 131 | 131 |
| PTSA (40%) | 8.3 | 8.3 | 8.3 |
| Irganox 1010[3] | 0.78 | 0.78 | 0.78 |

[1]Trademark, American Cyanamid Co., Wayne, New Jersey (highly methylated melamine formaldehyde resin)
[2]Trademark, Ciba-Geigy Corp.
[3]Trademark, Ciba-Geigy Corp. (antioxidant)

The above compositions were reduced to 30 sec. #4 Ford Cup viscosity with methyl amyl ketone. A control clearcoat was also prepared without any polymeric stabilizer.

The above clearcoats were sprayed over the basecoat of Example V using metal and plastic substrates and were cured at 121° C. for 30 minutes. The panels were exposed to ultraviolet light and humidity in a QUV machine for 1500 hours. The stabilized compositions at the end of the test showed far superior gloss retention than the control compositions which showed significant phase degradation and cracking.

EXAMPLE IX

Into a steel ball mill the following pigment pastes were ground.

| | Parts |
| --- | --- |
| Millbase a. | |
| Components | |
| A-85142[1] | 250 |
| Polyethylene wax (EA1157[2]) | 10 |
| Butyl acetate | 40 |
| Toluene | 40 |
| $TiO_2$ | 600 |
| Millbase b. | |
| Components | |
| Phthalocyanine blue | 60 |
| Toluene | 80 |
| VMP naphtha | 300 |
| Butyl acetate | 100 |
| A-85142[1] | 430 |
| Millbase c. | |
| Component | |
| Lando blue | 60 |

| | Parts |
|---|---|
| VMP naphtha | 286 |
| Methanol | 40 |
| A-8142[1] | 534 |
| Toluene | 80 |
| Millbase d. | |
| Component | |
| Furnace black | 40 |
| Xylene | 211 |
| RF9237[3] | 351 |
| VMP naphtha | 150 |
| Enamel Composition | |
| Millbase a. | 122 |
| Millbase b. | 39 |
| Millbase c. | 193 |
| Millbase d. | 97 |
| Modaflow | 4 |
| A-8142[1] | 476 |
| RF9237[3] | 150 |
| methyl amyl ketone | 48 |
| resin of Example I | 47 |
| methanol | 20 |
| xylene | 224 |

[1]High solids acrylic resin available from the Ford Motor Company Paint Plant, Mt. Clemens, MI.
[2]Trademark, N.L. Industries, Heighttown, New Jersey
[3]Melamine Resin, Monsanto Co., St. Louis, MO.

The above coating composition was spray applied over primed panels and cured for 20 minutes at 127° C. A control coating (without the stabilizer of Example I) was also applied and cured under the same conditions. Panels containing both the stabilized and the control compositions were exposed to ultraviolet light and humidity in a QUV machine for 500 hours. At the end of this test, the stabilized composition showed significantly less discoloration and loss of gloss as compared to the control composition.

EXAMPLE X

This Example illustrates the preparation of an epoxy ester resin according to the present invention. In a suitable reactor were charged 911 parts of Epon 829 (trademark of Shell Chemical Company), (diglycidyl ether of bisphenol-A), 564 parts of Empol 1014* and 728 parts of Soya fatty acid. The temperature of the mixture was brought up to about 177° C. at which point an exothermic reaction took place that raised the temperature up to about 193° C. After two hours at this temperature, the acid number was found to be 5.2. The reaction mixture was then cooled down to about 149° C. and 275 parts of methyl amyl ketone and 275 parts of cellosolve acetate were added. The resulting resin had a viscosity of W+ at 80% solids.
*Dimer and trademark of Emery Industries Inc.

EXAMPLE XI

A millbase, that is, a composition pigment paste was prepared by grinding in a ballmill the following mixture:

| Composition | Parts |
|---|---|
| Barium Sulfate | 1626 |
| Red Iron Oxide | 60 |
| Titanium dioxide | 105 |
| Silica | 75 |
| Strontium chromate | 99 |
| Polyethylene Wax (EA1157[1]) | 48 |
| Xylene | 200 |
| Toluene | 240 |
| 2 ethyl hexanol | 57 |

| Composition | Parts |
|---|---|
| Resin of Example X | 264 |

[1]Trademark, N.L. Industries, Height Town, New Jersey

EXAMPLE XII

A coating composition was prepared, which was adapted for use as a high solids, sprayable, pigmented primer for application over bare, unpolished steel automotive vehicle body panels in an automotive vehicle assembly operation. The coating composition components are shown below. The composition was reduced with methyl amyl ketone to about 18–25 sec. #4 Ford Cup, 27° C. to provide a preferred spraying viscosity.

| Composition | Parts |
|---|---|
| Epoxy Ester Resin of Example X | 270 |
| Millbase of Example VIII | 800 |
| Resimine 717[1] | 110 |
| Stabilizer of Example I | 8 |
| 6% Manganese Naphthanate (Drier) | 4 |
| Butanol | 35 |

[1]Trademark, Monsanto Co., St. Louis, MO. (low temperature, high solids methylated melamine-formaldehyde resin crosslinking agent).

The above coating composition was spray applied over unpolished Bonderite steel and cured for 30 minutes at 163° C. A control coating (without the stabilizer of Example I) was also applied and cured under the same conditions. Panel containing both the stabilized and the control compositions were exposed to ultraviolet light and humidity in a QUV machine for 300 hours. The stabilized composition at the end of this showed significantly less signs of phase degration and cracking.

EXAMPLE XIII

A polyvinyl chloride composition was prepared having the following formulation:

| Components | Parts by Weight |
|---|---|
| polyvinyl chloride | 200 |
| dioctyl phthalate | 100 |
| epoxidized soy bean oil | 4 |
| Irganox 1010[1] | 0.4 |
| calcium stearate | 2 |
| zinc stearate | 0.2 |
| stabilizer of Example I | 2 |

[1]Trademark, Ciba-Geigy Corp.

This formulation was mixed and sheeted off on a two roll mill to form sheets 1 mm thick. The light resistance of these sheets were determined by placing them in a QUV machine for 1500 hrs. A control composition without the stabilizer of Example I was also tested. After the test was completed the control sheets showed significantly worse embrittlement and discoloration than the stabilized sheet.

In view of the disclosure, many modifications of this invention will be apparent to those skilled in the art. It is intended that all such modifications which fall within the true scope of this invention be included within the terms of the appended claims.

What is claimed is:

1. A crosslinkable polymeric hindered amine light stabilizer characterized in that said stabilizer has a number average molecular weight ($\overline{M}_n$) of between about 500 and about 2000 and contains at least two, on average, primary hydroxyl groups, said stabilizer being the reaction product of:
(A) epoxy resin containing, on average, two epoxide groups per molecule; and
(B) polyalkylpiperidine being selected from compounds represented by the chemical formula:

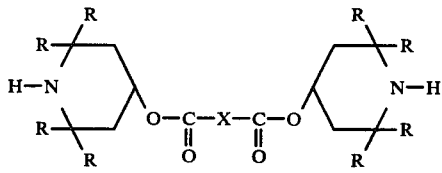

wherein each R is selected from any $C_1$–$C_6$ alkyl group and X is a group containing between about two and about 36 carbon atoms, and wherein said epoxy resin and said polyalkylpiperidine are reacted in a molar ratio of between about 6:5 and about 2:1 so as to form an epoxide functional polymer having on average, two epoxide groups per molecule; and
(C) monomer containing at least one primary hydroxyl group and a reactive functionality capable of reacting with the epoxide groups of said epoxide functional polymer, wherein said monomer is employed in amounts which are sufficient to react essentially all of the epoxide groups present on said epoxide functional polymer.

2. A polymeric light stabilizer according to claim 1, wherein said epoxy resin is a saturated epoxy resin.

3. A polymeric light stabilizer, according to claim 1, wherein said epoxide groups of said epoxy resin are terminal epoxide groups.

4. A polymeric light stabilizer according to claim 1, wherein said epoxy resin has a molecular weight of between about 150 and about 600.

5. A polymeric light stabilizer according to claim 1, wherein said alkyl groups of said polyalkylpiperidine are methyl groups.

6. A polymeric light stabilizer according to claim 1, wherein X of said polyalkylpiperidine chemical formula is selected from $C_2$–$C_8$ alkylene groups.

7. A polymeric light stabilizer according to claim 1, wherein said monomer is selected from (a) hydroxy functional carboxylic acids and (b) hydroxy functional secondary amines.

8. A polymeric light stabilizer according to claim 7, wherein said monomer contains more than one primary hydroxyl group.

* * * * *